(12) United States Patent
Takizawa et al.

(10) Patent No.: US 9,846,454 B2
(45) Date of Patent: Dec. 19, 2017

(54) ELECTRONIC DEVICE

(71) Applicant: FUJITSU LIMITED, Kawasaki-shi, Kanagawa (JP)

(72) Inventors: Hiroshi Takizawa, Kawasaki (JP); Shigeru Yamaguchi, Kawasaki (JP); Kazunori Murayama, Ichikawa (JP); Junichi Murakoso, Sagamihara (JP)

(73) Assignee: FUJITSU LIMITED, Kawasaki (JP)

(*) Notice: Subject to any disclaimer, the term of this patent is extended or adjusted under 35 U.S.C. 154(b) by 146 days.

(21) Appl. No.: 14/573,616

(22) Filed: Dec. 17, 2014

(65) Prior Publication Data

US 2015/0198977 A1 Jul. 16, 2015

(30) Foreign Application Priority Data

Jan. 14, 2014 (JP) ................. 2014-004608

(51) Int. Cl.
G02F 1/13 (2006.01)
G06F 1/16 (2006.01)
G06F 3/01 (2006.01)
G06F 3/041 (2006.01)

(52) U.S. Cl.
CPC .......... *G06F 1/1643* (2013.01); *G06F 1/1626* (2013.01); *G06F 1/1652* (2013.01); *G06F 1/1656* (2013.01); *G06F 3/016* (2013.01); *G06F 3/041* (2013.01); *G06F 3/0412* (2013.01); *G06F 2203/04103* (2013.01)

(58) Field of Classification Search
USPC .................................... 361/679.21
See application file for complete search history.

(56) References Cited

U.S. PATENT DOCUMENTS

2003/0184514 A1* 10/2003 Grosfeld ............... G06F 1/1626
345/156
2011/0051334 A1* 3/2011 Griffith ............... G06F 3/03547
361/679.01
2011/0102341 A1 5/2011 Imai et al.
2012/0162143 A1 6/2012 Kai et al.
(Continued)

FOREIGN PATENT DOCUMENTS

EP 2 876 527 A1 5/2015
JP 2011-096183 A 5/2011
(Continued)

OTHER PUBLICATIONS

Extended European Search Report dated May 8, 2015, issued in corresponding European Patent Application No. 14198592.9 (21 pages).
(Continued)

*Primary Examiner* — Jerry Wu
(74) *Attorney, Agent, or Firm* — Westerman, Hattori, Daniels & Adrian, LLP

(57) ABSTRACT

An electronic device includes a device body, a touch panel which having a front side and a reverse side, a vibration unit that is disposed on the reverse side and vibrates the touch panel, and a flexible member that is disposed on an inside and on the reverse side of the touch panel, the flexible member connecting the device body and the reverse side of the touch panel in a watertight manner and being flexibly deformed upon vibration of the touch panel.

5 Claims, 11 Drawing Sheets

(56) References Cited

U.S. PATENT DOCUMENTS

2013/0229088 A1* 9/2013 Jung ................. G06F 3/016
                                                310/317
2013/0342484 A1  12/2013 Bae et al.
2013/0342970 A1  12/2013 Franklin et al.
2014/0091536 A1   4/2014 Bae et al.

FOREIGN PATENT DOCUMENTS

| JP | 2012-181771 A | 9/2012 |
| JP | 2012-185815 A | 9/2012 |
| JP | 2012-216204 A | 11/2012 |
| JP | 2013-080364 A | 5/2013 |
| WO | 2012/137440 A1 | 10/2012 |
| WO | 2013/150807 A1 | 10/2013 |

OTHER PUBLICATIONS

Office Action dated Jan. 15, 2016, issued in counterpart European Patent Application No. 14198592.9. (7 pages).

Invitation Pursuant to Article 94(3) and Rule 71(1) EPC dated Aug. 10, 2016, issued in counterpart European Patent Application No. 14 198 592.9. (4 pages).

Office Action dated May 9, 2017, issued in counterpart Japanese Patent Application No. 2014-004608, with English tanslation. (7 pages).

Office Action dated Aug. 22, 2017, issued in counterpart Japanese Application No. 2014-004608, with English machine translation. (7 pages).

* cited by examiner

ELECTRONIC DEVICE

CROSS-REFERENCE TO RELATED APPLICATION

This application is based upon and claims the benefit of priority from the prior Japanese Patent Application No. 2014-004608, filed on Jan. 14, 2014, the entire contents of which are incorporated herein by reference.

FIELD

The embodiment discussed herein is related to an electronic device.

BACKGROUND

Among electronic devices in which a touch panel disposed in a device body is vibrated, an electronic device that connects the device body and an outer peripheral portion of the touch panel to each other with an elastic body is known. In such an electronic device, by connecting the device body and the outer peripheral portion of the touch panel with the elastic body, vibration of the touch panel is suppressed from being transmitted to the device body and waterproofing is provided between the touch panel and the device body. The above technique is disclosed in Japanese Laid-open Patent Publication No. 2011-96183, Japanese Laid-open Patent Publication No. 2012-185815, and Japanese Laid-open Patent Publication No. 2012-181771, for example.

SUMMARY

According to an aspect of the invention, an electronic device includes a device body, a touch panel which having a front side and a reverse side, a vibration unit that is disposed on the reverse side and vibrates the touch panel, and a flexible member that is disposed on an inside and on the reverse side of the touch panel, the flexible member connecting the device body and the reverse side of the touch panel in a watertight manner and being flexibly deformed upon vibration of the touch panel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of a technique disclosed in the present application will be described.

(Electronic Device 10)

Figure 1:
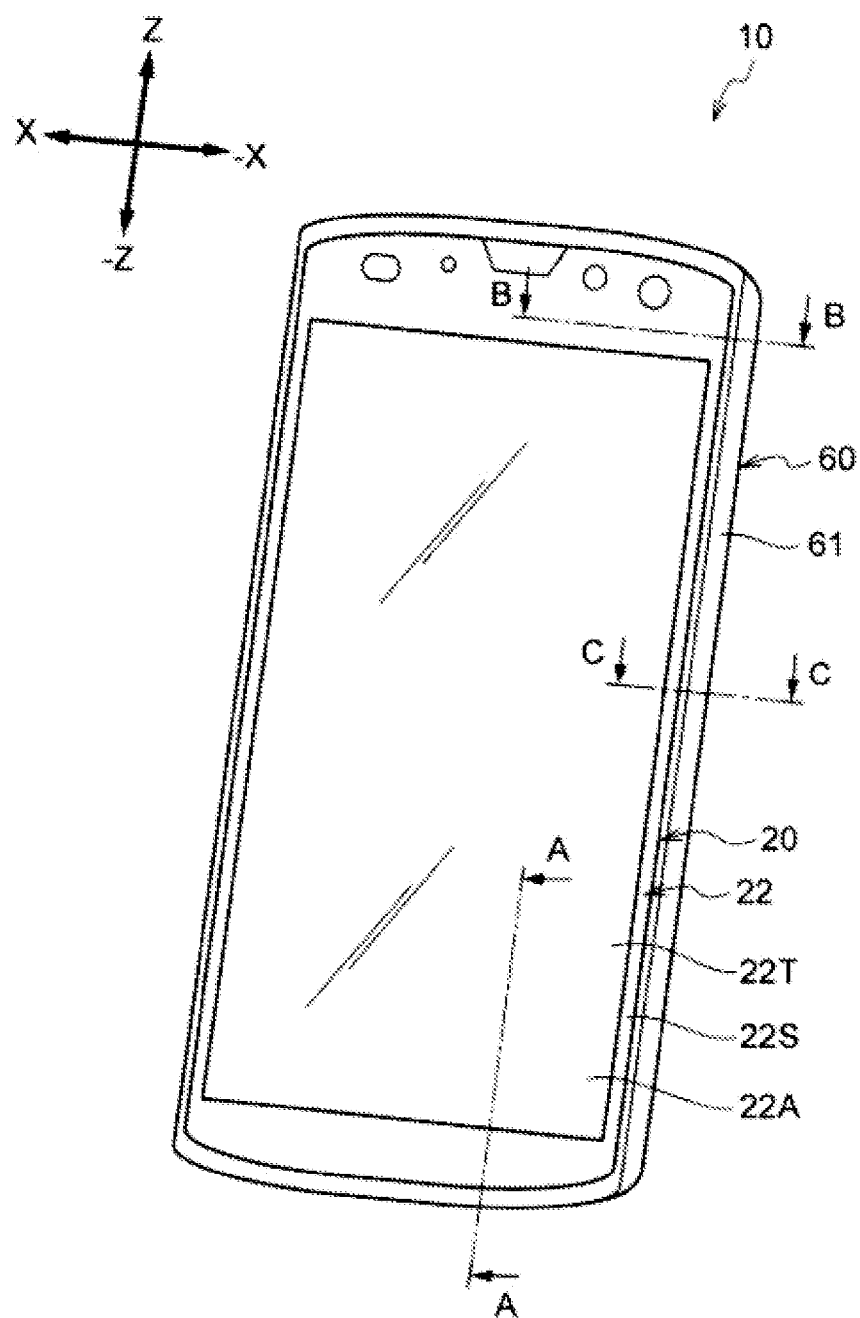
FIG. 1 is a perspective view of an electronic device according to an embodiment.
Figure 2:
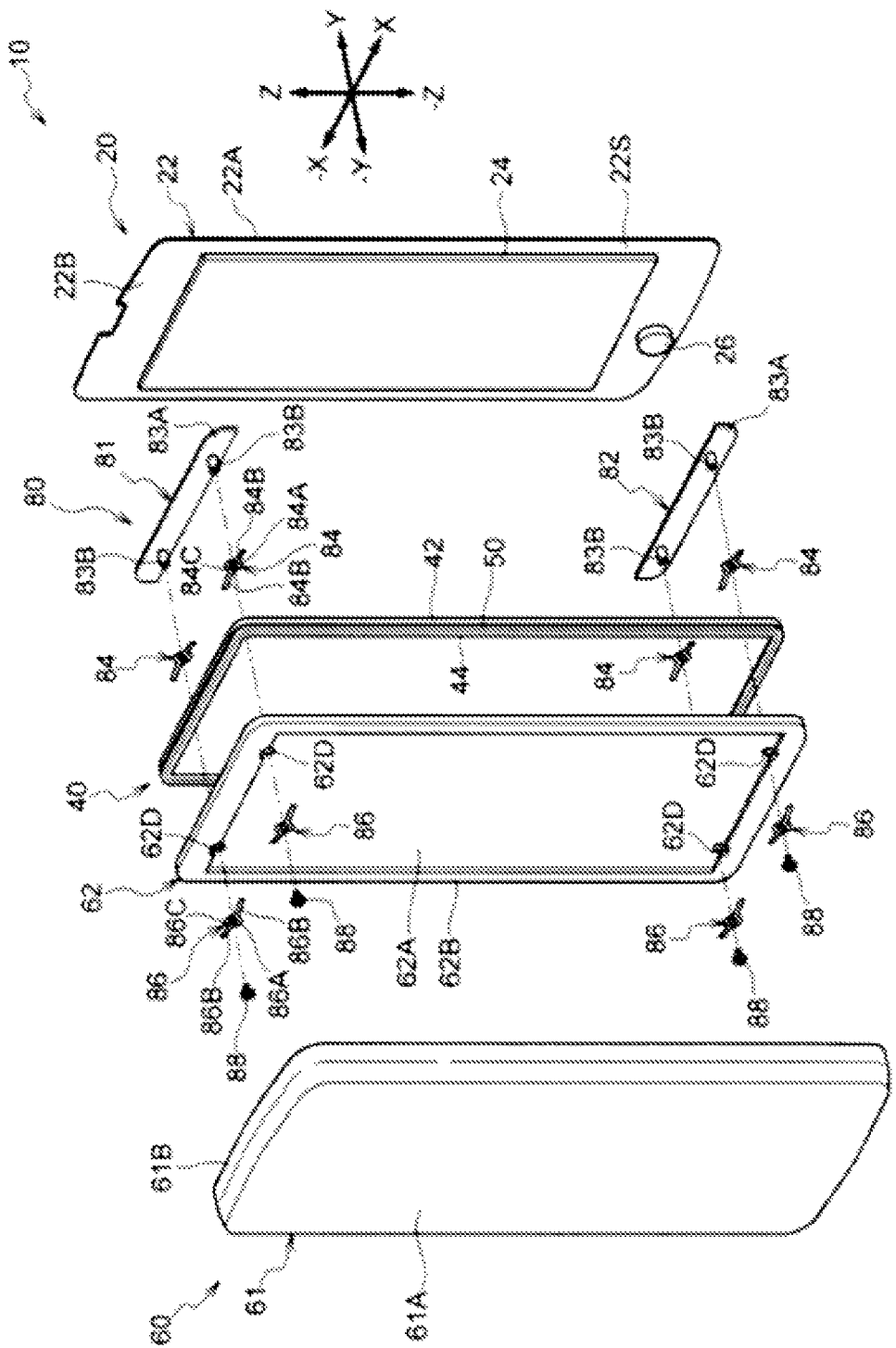
FIG. 2 is an exploded perspective view of the electronic device according to the embodiment.

An electronic device 10 according to the present embodiment will be described first. FIG. 1 is a perspective view illustrating the electronic device 10. FIG. 2 is an exploded perspective view illustrating the electronic device 10.

Note that the terms X direction, −X direction, Y direction, −Y direction, Z direction, and −Z direction denote the directions of the arrows illustrated in the drawings. Furthermore, the symbol in the drawings depicted with an "X" in a "O" indicates an arrow extending from the front side towards the backside of the sheet. Furthermore, the symbol in the drawings depicted with a "•" in a "O" indicates an arrow extending from the back side towards the front side of the sheet.

As regards the electronic device 10, as illustrated in FIG. 1, electronic devices such as a smart phone may be cited, for example. Note that the electronic device 10 may be an electronic device such as a tablet terminal or a notebook computer, and various electronic devices may be cited. Specifically, as illustrated in FIG. 2, the electronic device 10 includes a touch panel unit 20, a sealing unit 40, a device body 60, and a support mechanism 80.

(Touch Panel Unit 20)

As illustrated in FIG. 2, the touch panel unit 20 includes a touch panel 22, a display unit 24, and a vibration unit 26. The display unit 24 is disposed on a back surface 22B side (the −Y direction side) of the touch panel 22. The display unit 24 is a member that displays information and the like in the Y direction through the touch panel 22. As the display unit 24, for example, a liquid display panel (LCD), an organic EL display panel, or the like is used.

Note that the back surface 22B (a surface on the −Y direction side) of the touch panel 22 refers to a surface on the other side with respect to a front surface 22A (a surface on the Y direction side) of the touch panel 22. The front surface 22A of the touch panel 22 is an operation surface on which an operator touches to perform a predetermined operation. Furthermore, the front surface 22A of the touch panel 22 is also a display surface that displays information of the display unit 24 to the operator.

The touch panel 22 is a member that detects the predetermined operation that is carried out by touching the front surface 22A. The touch panel 22 is a member that is provided separately from the display unit 24. Furthermore, as illustrated in FIG. 1, the touch panel 22 includes a transparent portion 22T that is transparent so that the operator may visually recognize the displayed contents of the display unit 24. Furthermore, the touch panel 22 includes a frame-shaped portion 22S that is formed in a frame shape around the transparent portion 22T.

Figure 3:
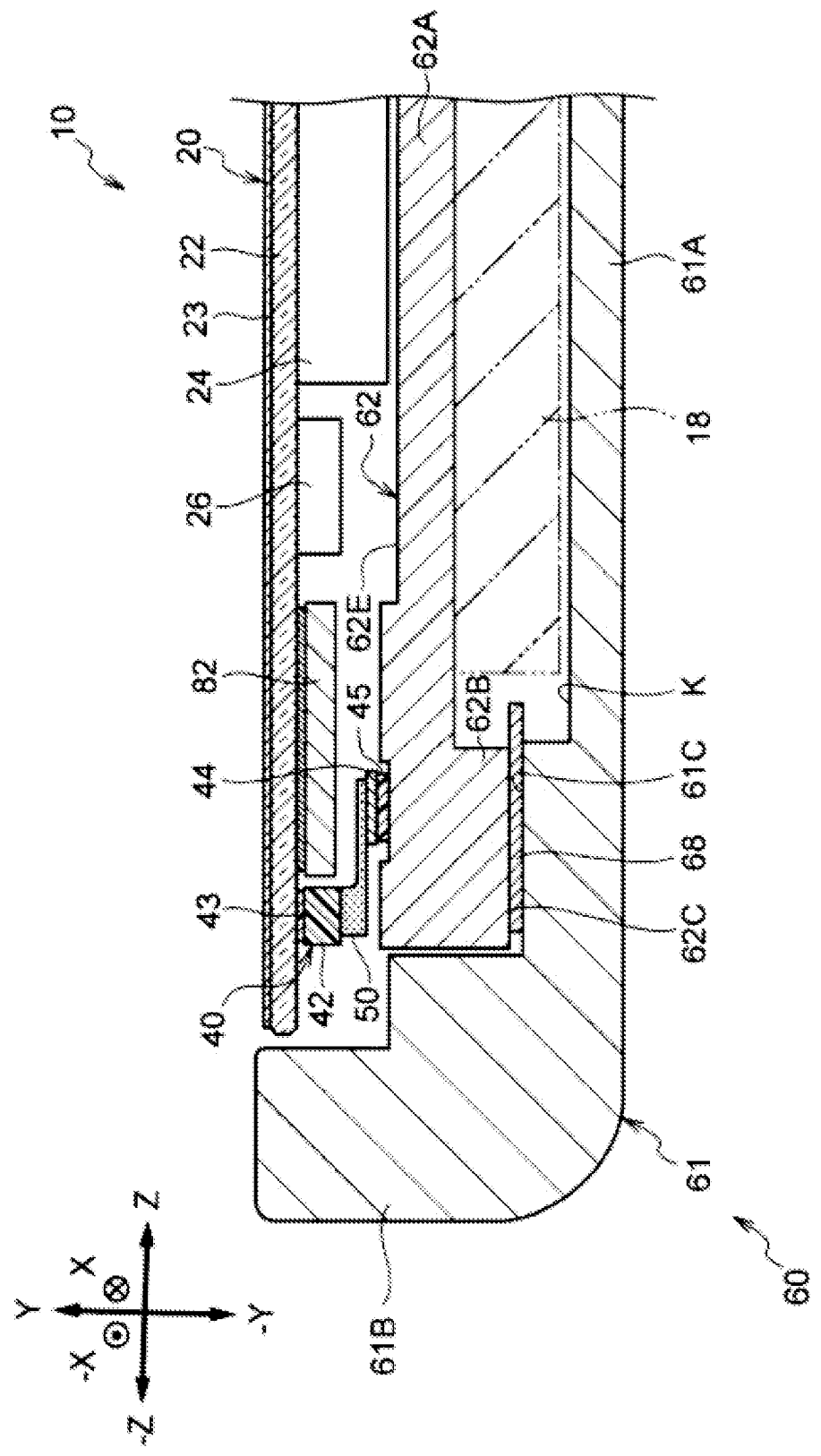
FIG. 3 is a cross-sectional view taken along line A-A of the electronic device illustrated in FIG. 1.

As the touch panel 22, for example, a touch panel of a system such as a resistance film system, an electrostatic capacity system, or an optical system may be used. Note that it is not a requisite for the touching object to physically touch the touch panel 22 in order for the touch panel 22 to detect the operation on the front surface 22A. For example, if the touch panel 22 is of an optical system, since the touch panel 22 detects the position on the touch panel 22 where the infrared light or the like has been blocked by the touching object, the touching object does not have to touch the touch panel 22. Note that as illustrated in FIG. 3, a protective layer 23 is provided on the front surface 22A of the touch panel 22.

Moreover, the operator is capable of inputting information according to the displayed content by operating the touch panel 22 based on the displayed content of the display unit 24 projected through the touch panel 22.

As illustrated in FIG. 2, the vibration unit 26 is attached to the back surface 22B of the frame-shaped portion 22S of the touch panel 22. The vibration unit 26 vibrates the touch panel 22 in a thickness direction (the −Y, Y direction) of the touch panel 22. Note that regarding the vibration components of the vibration unit 26, a component that vibrates the touch panel 22 in a surface direction (the direction perpendicular to the thickness direction) of the touch panel 22 may be included. As for the vibration unit 26, for example, an actuator including a piezoelectric element is used.

(Device Body 60)

As illustrated in FIG. 2, the device body 60 is disposed on the back surface 22B side (the −Y direction side) of the touch panel 22. The device body 60 includes a first housing 61 (a rear case) and a second housing 62 (a front case).

The first housing 61 is formed in a box shape in which the touch panel 22 side (the Y direction side) is open. In other words, the first housing 61 includes a rear wall 61A opposing the second housing 62 and a peripheral wall 61B that surrounds the periphery of the rear wall 61A.

Figure 5:
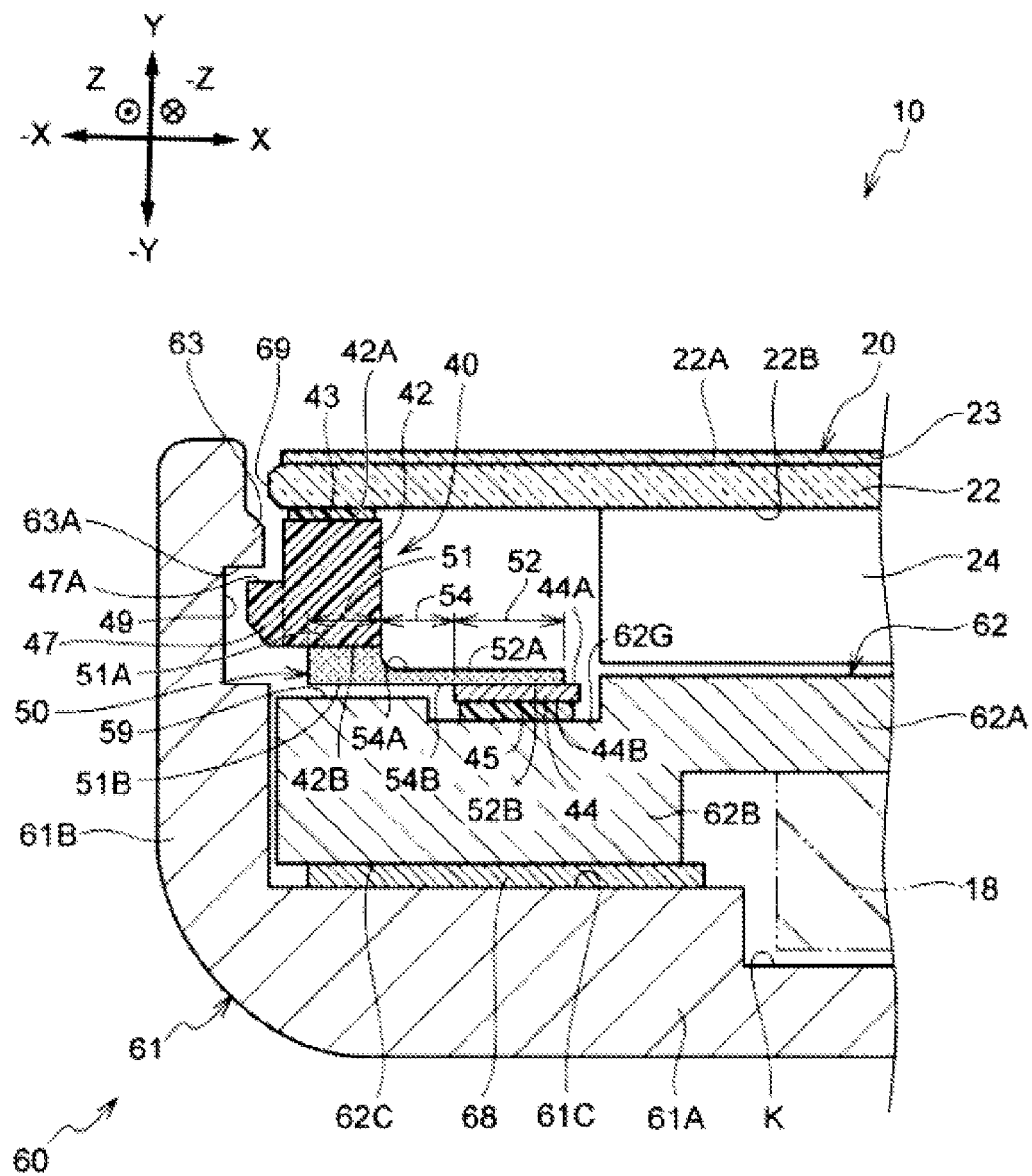
FIG. 5 is a cross-sectional view taken along line C-C of the electronic device illustrated in FIG. 1.

As illustrated in FIG. 5, a hook portion 63 is provided in a portion of the peripheral wall 61B of the first housing 61 in the circumferential direction. The hook portion 63 is formed in a hook shape in side view (when viewed in the −Z direction) so as to protrude towards the inner peripheral side (the X direction side in FIG. 5) of the peripheral wall 61B. The hook portion 63 includes an abutted surface 63A (a surface on the −Y direction side) serving as an abutted portion against which an abutting surface 47A of a hook portion 47 described later abuts.

Note that there is a gap 69 between the peripheral wall 61B of the first housing 61 and an outer peripheral surface (a lateral surface on the −X direction side in FIG. 5) of the touch panel 22. With the above, frictional resistance between the peripheral wall 61B and the outer peripheral surface of the touch panel 22 that is produced when the touch panel 22 vibrates is suppressed. Furthermore, there is a gap 49 between the peripheral wall 61B of the first housing 61 and an outer peripheral surface (a lateral surface on the −X direction side in FIG. 5) of a frame-shaped member 42 described later. With the above, frictional resistance between the peripheral wall 61B and the frame-shaped member 42 described later that is produced when the touch panel 22 vibrates is suppressed.

As illustrated in FIG. 2, the second housing 62 is disposed on the touch panel 22 side (on the Y direction side) with respect to the first housing 61. The second housing 62 is formed in a box shape in which the first housing 61 side is open. In other words, the second housing 62 includes a front wall 62A opposing the rear wall 61A of the first housing 61 and a peripheral wall 62B that surrounds the periphery of the front wall 62A. Insertion holes 62D that are aligned in the X direction are provided in end portions of the front wall 62A in the Z direction and the −Z direction. Each insertion holes 62D penetrates the front wall 62A. In each of the insertion holes 62D, a boss portion 83B of a fixing plate 81 or 82 described later is inserted.

As illustrated in FIG. 3, a back surface 62C of the peripheral wall 62B of the second housing 62 is fixed to a front surface 61C of the rear wall 61A of the first housing 61 with a fixing material 68. As the fixing material 68, for example, an adhesive or a double-sided adhesive tape is used. Note that the second housing 62 and the first housing 61 may be fixed to each other with screws.

Furthermore, as illustrated in FIG. 3, the front wall 62A of the second housing 62 and the rear wall 61A of the first housing 61 oppose each other with a gap therebetween. A circuit substrate 18 that drives the electronic device 10 and other components are accommodated in a space K between the front wall 62A and the rear wall 61A.

(Support Mechanism 80)

The support mechanism 80 is a mechanism that supports the touch panel unit 20 so that the touch panel unit 20 is movable in the thickness direction (the −Y, Y direction) of the touch panel 22 with respect to the device body 60. As illustrated in FIG. 2, specifically, the support mechanism 80 includes the fixing plates 81 and 82 each serving as an example of a securing member, four flat springs 84, four flat springs 86, and four screws 88.

Figure 4:
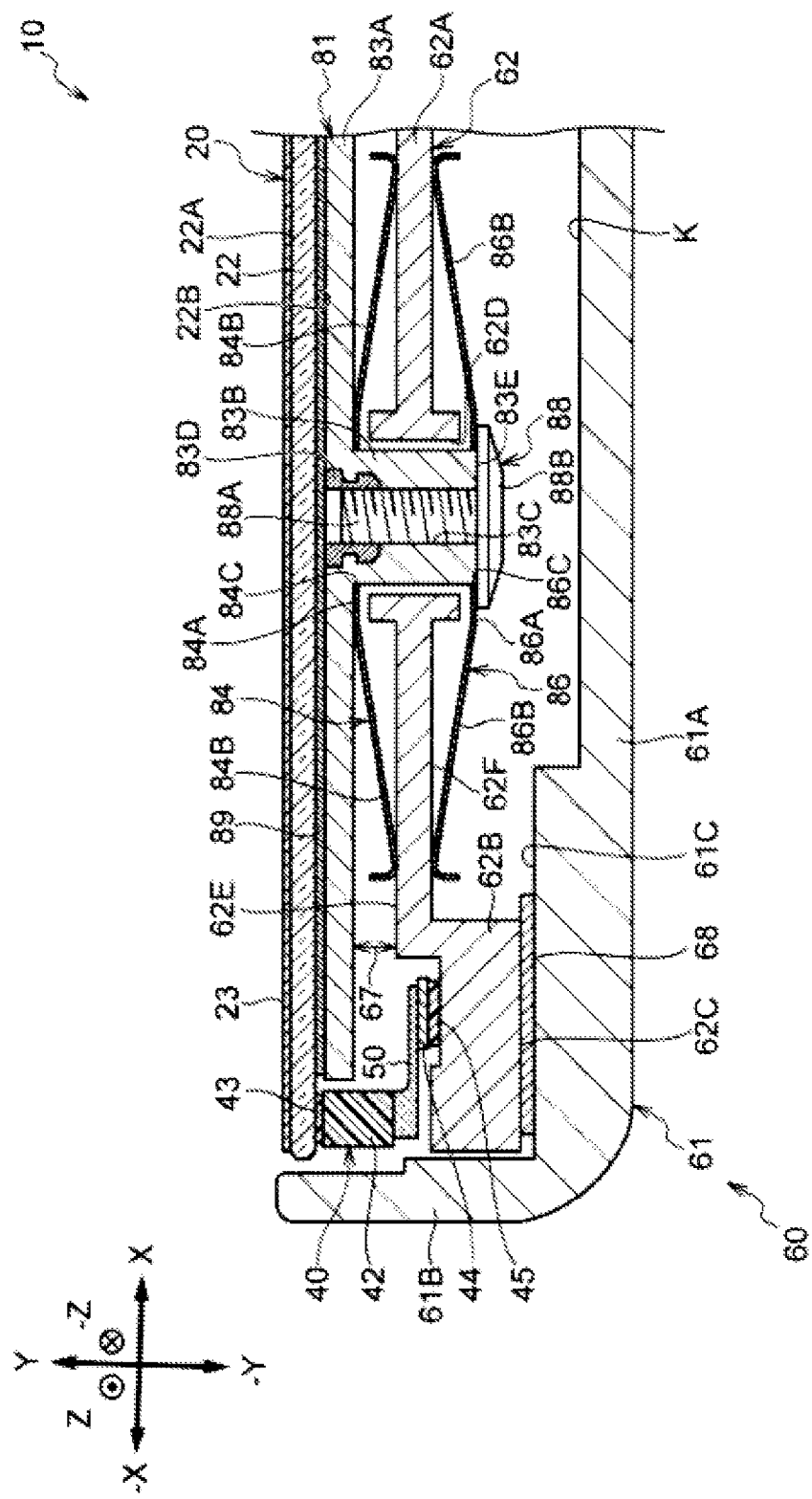
FIG. 4 is a cross-sectional view taken along line B-B of the electronic device illustrated in FIG. 1.

The fixing plates 81 and 82 each include a plate portion 83A and two boss portions 83B that protrude from the plate portion 83A towards the second housing 62 side (the −Y, Y direction). As illustrated in FIG. 4, through holes 83C that penetrate the plate portions 83A and the boss portions 83B in the thickness direction (the Y direction) of the plate portion 83A are formed in the fixing plates 81 and 82. A screw portion 83D into which a screw 88 is screwed is provided in each of the through holes 83C.

As illustrated in FIG. 2, the plate portions 83A of the fixing plates 81 and 82 are fixed to the back surface 22B of the frame-shaped portion 22S (see FIG. 2) of the touch panel 22 with fixing materials 89. As the fixing material 89, for example, an adhesive or a double-sided adhesive tape is used. The boss portions 83B are inserted into the insertion holes 62D of the second housing 62. With the above, the boss portions 83B each function as an example of a penetration portion that penetrates the front wall 62A of the second housing 62.

As illustrated in FIGS. 2 and 4, the flat springs 84 each include a circular body portion 84A and two extension portions 84B that extend outwardly in the radial direction of the body portion 84A from the body portion 84A. Through holes 84C through which the boss portions 83B are inserted in the thickness direction (the −Y direction) of the flat spring 84 are formed in the body portions 84A. The flat springs 84 are attached to the fixing plates 81 and 82 by inserting the boss portions 83B through the through holes 84C.

As illustrated in FIG. 4, each of the extension portions 84B is inclined towards the second housing 62 side (the −Y direction side) as each of the extension portions 84B extends towards the distal end side thereof. Furthermore, the tip of each of the extension portions 84B is bent towards the touch panel 22 side (the Y direction side). The tip of each of the extension portions 84B is in contact with a front surface 62E (a surface on the Y direction side) of the front wall 62A of the second housing 62.

The flat springs 86 each have a structure that is the same as the structure of the flat springs 84. Accordingly, similar to the flat springs 84, the flat springs 86 each include a circular body portion 86A and two extension portions 86B that extend outwardly in the radial direction of the body portion 86A from the body portion 86A. Through holes 86C through which the boss portions 83B are inserted in the thickness direction of the flat spring 84 are formed in the body portions 86A.

The flat springs 86 are disposed between the second housing 62 and the first housing 61. The flat springs 86 are attached to the fixing plates 81 and 82 by inserting the boss portions 83B through the through holes 86C.

As illustrated in FIG. 4, each of the extension portions 86B is inclined towards the second housing 62 side (the Y direction side) as each of the extension portions 86B extends towards the distal end side thereof. Furthermore, the tip of each of the extension portions 86B is bent towards the first housing 61 side (the −Y direction side). The tip of each of the extension portions 86B is in contact with a back surface 62F (a surface on the −Y direction side) of the front wall 62A of the second housing 62.

Shaft portions 88A are inserted through the through holes 83C of the fixing plate 81 and 82 so as to screw the screws 88 into the screw portion 83D. Head portions 88B of the screws 88 are in contact with end surfaces 83E of the boss portions 83B. Furthermore, there are gaps between the head portions 88B of the screws 88 and the back surface 62F of the front wall 62A of the second housing 62.

The diameter of the head portion 88B of each screw 88 is larger than the inside diameter of the through hole 86C of each flat spring 86. Accordingly, the head portions 88B of the screws 88 restrict the flat springs 86 from moving in the −Y direction with respect to the boss portion 83B. In other words, the screws 88 function as restricting portions that restrict the flat springs 86 from being separated from the corresponding boss portion 83B in the −Y direction.

Furthermore, the diameter of the head portion 88B of each screw 88 is larger than the diameter of each insertion hole 62D. Accordingly, when the touch panel unit 20 moves in the Y direction with respect to the device body 60 (the second housing 62), the head portions 88B of the screws 88 abut against the edge portions of the insertion holes 62D. Accordingly, the screws 88 restrict the touch panel unit 20 from moving more than a permissible amount in a direction (the Y direction) departing from the second housing 62.

Furthermore, in the support mechanism 80, the flat springs 84 and the flat springs 86 hold the front wall 62A (an example of a wall portion) of the second housing 62 therebetween. Accordingly, the touch panel unit 20 is supported at a predetermined reference position (the position illustrated in FIG. 4). In the predetermined reference position, there is a gap 67 between the touch panel unit 20 and the second housing 62. In other words, the touch panel unit 20 is supported so as to be displaceable in the thickness direction (the −Y, Y direction) of the touch panel 22.

When the touch panel unit 20 that is supported by the flat springs 84 and the flat springs 86 is displaced towards the −Y direction side, the amount of elastic deformation of the flat springs 84 becomes large. The touch panel unit 20 is returned to the predetermined reference position (to the original position) by elastic force of the flat springs 84. Furthermore, when the touch panel unit 20 is displaced towards the Y direction side, the amount of elastic deformation of the flat springs 86 becomes large. The touch panel unit 20 is returned to the predetermined reference position by elastic force of the flat springs 86.

(Sealing Unit 40)

Figure 6:
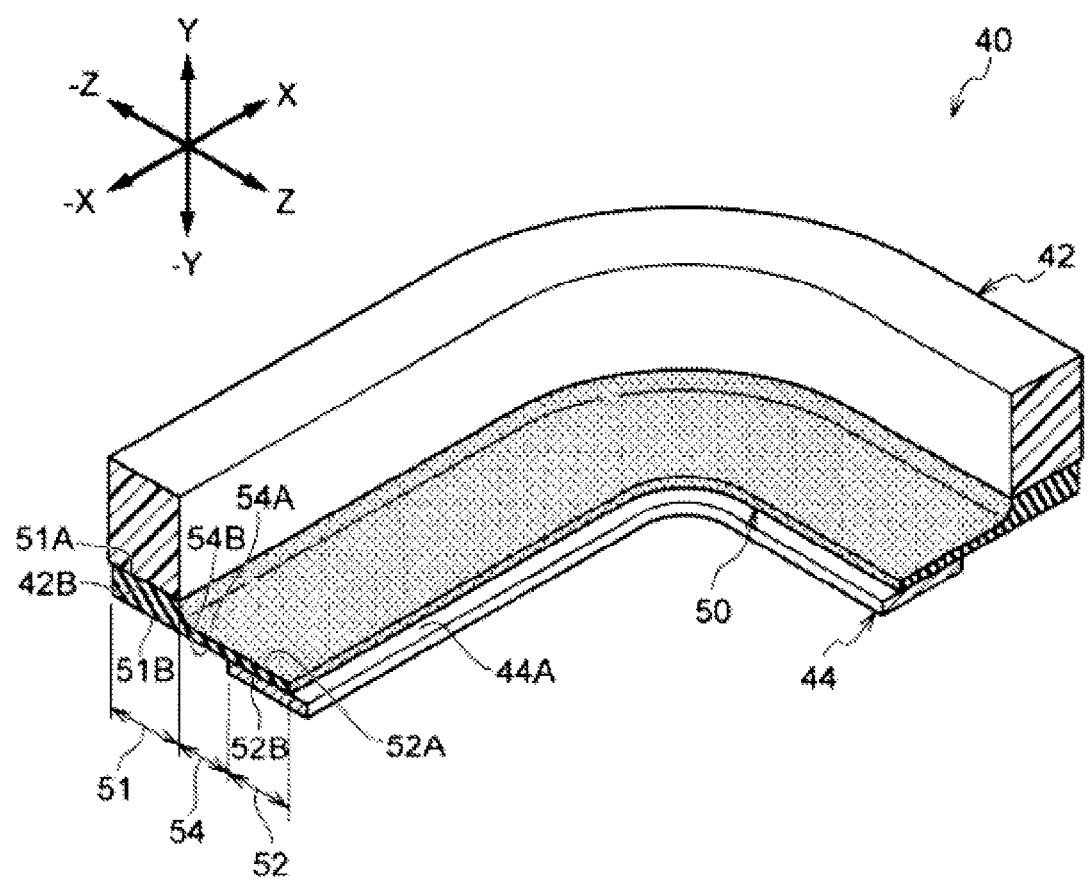
FIG. 6 is a perspective view illustrating, in an enlarged manner, a portion of a sealing unit of the electronic device according to the embodiment.

As illustrated in FIG. 2, the sealing unit 40 is disposed between the touch panel unit 20 and the device body 60 (the second housing 62). The sealing unit 40 is a unit that seals between the touch panel unit 20 and the device body 60 (the second housing 62). As illustrated in FIG. 6, specifically, the sealing unit 40 includes the frame-shaped member 42, a flexible member 50, and a plate frame 44. The frame-shaped member 42, the flexible member 50, and the plate frame 44 are formed integrally.

The frame-shaped member 42 is formed in a frame shape (see FIG. 2) when viewed in the −Y direction. Furthermore, as illustrated in FIGS. 5 and 6, each side of the frame-shaped member 42 is formed so as to have a rectangular cross section. The frame-shaped member 42 is formed of a resin material that has a rigidity that is higher than that of the flexible member 50. In other words, the frame-shaped member 42 functions as a high rigidity member that has a rigidity that is higher than that of the flexible member 50. Note that the frame-shaped member 42 may be formed of a material other than the resin material such as a metal material.

As illustrated in FIG. 5, the whole circumference of a front surface 42A of the frame-shaped member 42 is fixed to the outer peripheral portion of the back surface 22B of the touch panel 22 with a fixing material 43. As the fixing material 43, for example, an adhesive or a double-sided adhesive tape is used.

As illustrated in FIG. 5, the hook portion 47 is provided in a portion of the frame-shaped member 42 in the circumferential direction so as to correspond to the hook portion 63. The hook portion 47 is formed in a hook shape in side view (when viewed in the −Z direction) so as to protrude towards the outer peripheral side (the −X direction side in FIG. 5) of the frame-shaped member 42. The hook portion 47 includes an abutting surface 47A (a surface on the Y direction side) serving as an abutting portion against which an abutted surface 63A of the hook portion 63 is abutted. There is a gap provided between the abutting surface 47A and the abutted surface 63A. Accordingly, displacement of the frame-shaped member 42 in the Y direction is permitted. Furthermore, when the frame-shaped member 42 is displaced in the Y direction, the abutting surface 47A abuts against the abutted surface 63A so as to restrict the frame-shaped member 42 (the touch panel 22) from moving in a direction (the Y direction) departing from the second housing 62.

The plate frame 44 is formed in a frame shape (see FIG. 2) when viewed in the −Y direction. Furthermore, as illustrated in FIG. 5, the plate frame 44 is formed in a tabular shape having a thickness in the Y direction. The plate frame 44 is formed of a metal material that has a rigidity that is higher than that of the flexible member 50. In other words, the plate frame 44 functions as a high rigidity member that has a rigidity that is higher than that of the flexible member 50. Note that the plate frame 44 may be formed of a material other than the metal material such as a resin material.

As illustrated in FIG. 5, the plate frame 44 is disposed on the inner peripheral side (the X direction in FIG. 5) of the frame-shaped member 42 when seen from the front surface 22A side of the touch panel 22. Furthermore, the plate frame 44 is disposed on the −Y direction side with respect to the frame-shaped member 42 when viewed in the X direction in FIG. 5. The whole circumference of a back surface 44B of the plate frame 44 is fixed to a front surface 62G of the peripheral wall 62B of the second housing 62 with a fixing material 45. As the fixing material 45, for example, an adhesive or a double-sided adhesive tape is used.

The flexible member 50 is formed in a frame shape (see FIG. 2) when viewed in the −Y direction. Furthermore, as illustrated in FIG. 6, the flexible member 50 is formed in a tabular shape (a sheet shape) having a thickness in the Y direction. The flexible member 50 is formed of a material that has elasticity and a waterproof property. Specifically, the flexible member 50 is formed of an elastic material such as, for example, silicone rubber.

Furthermore, the flexible member 50 is disposed along the outer peripheral portion of the touch panel 22 when viewed from the front surface side of the touch panel 22 and seals between the touch panel 22 and the device body 60 (the second housing 62). In other words, the flexible member 50 connects the touch panel 22 and the device body 60 (the second housing 62) to each other in a watertight manner. Furthermore, specifically, the flexible member 50 includes a panel connection portion 51, a body connection portion 52, and a deformation portion 54.

As illustrated in FIG. 5, the panel connection portion 51 is disposed outside the deformation portion 54 when viewed from the front surface side of the touch panel 22. In other words, the panel connection portion 51 is disposed on the outer peripheral side (on the −X direction side in FIG. 5) of the touch panel 22 with respect to the deformation portion 54 when seen from the front surface side of the touch panel 22. The panel connection portion 51 has a thickness (dimension in the Y direction) that is larger than that of the deformation portion 54 and that of the body connection portion 52.

Furthermore, a front surface 51A of the panel connection portion 51 is fixed to a back surface 42B of the frame-shaped member 42. Accordingly, the panel connection portion 51 connects the deformation portion 54 and the touch panel 22 (the touch panel unit 20) to each other through the frame-shaped member 42.

Furthermore, the front surface 51A of the panel connection portion 51 is fixed to the back surface 42B of the frame-shaped member 42 and is bound thereto. A back surface 51B of the panel connection portion 51 is unfixed. In other words, the back surface 51B of the panel connection portion 51 is unbound. As illustrated in FIG. 5, a gap 59 is formed between the back surface 51B of the panel connection portion 51 and the second housing 62. Accordingly, the panel connection portion 51 and the frame-shaped member 42 are capable of moving in the Y direction side (the side approaching the second housing 62).

The body connection portion 52 is disposed inside the deformation portion 54 when viewed from the front surface side of the touch panel 22. In other words, the body connection portion 52 is disposed on the inner peripheral side (on the X direction side in FIG. 5) of the touch panel 22 with respect to the deformation portion 54 when seen from the front surface side of the touch panel 22. A back surface 52B of the body connection portion 52 is fixed to a front surface 44A of the plate frame 44. Accordingly, the body connection portion 52 connects the deformation portion 54 and the device body 60 (the second housing 62) to each other through the plate frame 44.

Furthermore, the back surface 52B of the body connection portion 52 is fixed to the front surface 44A of the plate frame 44 and is bound thereto. A front surface 52A of the body connection portion 52 is unfixed. In other words, the front surface 52A of the body connection portion 52 is unbound.

The deformation portion 54 connects the panel connection portion 51 and the body connection portion 52 to each other at a portion between the panel connection portion 51 and the body connection portion 52. A front surface 54A and a back surface 54B of the deformation portion 54 are unfixed. In other words, the front surface 54A and the back surface 54B of the deformation portion 54 are unbound. Accordingly, the vibration in the thickness direction (the −Y, Y direction) of the touch panel 22 displaces the frame-shaped member 42 and the panel connection portion 51 in the −Y, Y direction and, as a result, flexible deformation occurs in the deformation portion 54 in the −Y, Y direction.

Specifically, deformation in which the deformation portion 54 is curved or bent in a convex manner towards the Y direction side and deformation in which the deformation portion 54 is curved or bent in a concave manner towards the Y direction side repeatedly occur. When the deformation portion 54 is deformed in a convex manner towards the Y direction side, tensile stress occurs on the front surface 54A of the deformation portion 54 and the front surface 54A is expanded. In the back surface 54B of the deformation portion 54, when the deformation portion 54 is deformed in a convex manner towards the Y direction side, compressive stress occurs and the back surface 54B is constricted. On the other hand, when the deformation portion 54 is deformed in a concave manner towards the Y direction side, compressive stress occurs on the front surface 54A of the deformation portion 54 and the front surface 54A is constricted. In the back surface 54B of the deformation portion 54, when the deformation portion 54 is deformed in a concave manner towards the Y direction side, tensile stress occurs and the back surface 54B is expanded. In other words, flexible deformation accompanied with the vibration of the touch panel 22 refers to deformation in which, between the two surfaces (the front surface 54A and the back surface 54B) of the deformation portion 54 that are opposite each other, one surface becomes convex and the other surface becomes concaved.

Note that in the present embodiment, the entire flexible member 50 is disposed so as to be inside a projection of the front surface 22A (a display surface) of the touch panel 22 that is projected on a vertical plane of projection. In other words, the entire flexible member 50 is disposed inside the touch panel 22 when viewed from the front surface side of the touch panel 22. Accordingly, the panel connection portion 51, the body connection portion 52, and the deformation portion 54 are entirely disposed inside the touch panel 22 when viewed from the front surface side of the touch panel 22. Specifically, the panel connection portion 51, the body connection portion 52, and the deformation portion 54 are entirely disposed on the inner peripheral side with respect to the peripheral edge of the touch panel 22 when viewed from the front surface side of the touch panel 22. Note that the outer peripheral surface of the flexible member 50 and the outer peripheral surface of the touch panel 22 may be positioned on the same plane. In other words, it is only sufficient that the panel connection portion 51, the body connection portion 52, and the deformation portion 54 each do not jut out to the outside of the touch panel 22 when viewed from the front surface side of the touch panel 22.

Note that in the present embodiment, similar to the flexible member 50, the entire frame-shaped member 42 and the entire plate frame 44 are disposed inside the touch panel 22 when viewed from the front surface side of the touch panel 22. Furthermore, since the thickness (the dimension in the Y direction) of the flexible member 50 is included in the thickness of the internal components of the display unit 24 and the like, adoption of the structure of the present application does not increase the thickness of the apparatus.

Functions of Present Embodiment

Functions of the present embodiment will be described next.

The operator operates the touch panel 22 based on the displayed content of the display unit 24 projected through the touch panel 22. Accordingly, information according to the displayed content is input. When the front surface 22A of the touch panel 22 is pressed towards the −Y direction side with the operation on the touch panel 22 by the operator, the touch panel unit 20 is displaced towards the −Y direction side. With the displacement of the touch panel unit 20 towards the −Y direction side, the fixing plates 81 and 82 are also moved towards the −Y direction side. Accordingly, the amount of elastic deformation of the flat springs 84 increases. The touch panel 22 is returned to the predetermined reference position by the above elastic force of the flat springs 84.

As described above, since the touch panel 22 is returned to its reference position using the elastic force of the flat springs 84, return of the touch panel 22 to the reference position is fast. Accordingly, in a structure in which the pressing force on the touch panel 22 pressed by the operator is detected as a displacement of the touch panel 22, even if the touch panel 22 is pressed successively, the pressing may be detected accurately.

Furthermore, in the present embodiment, the vibration unit 26 vibrates the touch panel 22 in the thickness direction (the −Y, Y direction) of the touch panel 22 in accordance with the operation on the touch panel 22 by the operator. With the vibration of the touch panel 22, the frame-shaped member 42 and the panel connection portion 51 are displaced in the thickness direction (the −Y, Y direction) of the touch panel 22. With the above, since flexible deformation occurs in the deformation portion 54, the vibration of the touch panel 22 is not easily transmitted to the second housing 62 (the device body 60) side. Accordingly, loss of vibration is small and the touch panel 22 may be vibrated aggressively. By aggressively vibrating the touch panel 22, the operation feel may be effectively provided to the operator.

Furthermore, in the present embodiment, the sealing unit 40 including the flexible member 50 seals the whole outer periphery of the touch panel 22. Accordingly, intrusion of dust, water, and the like between the touch panel 22 and the device body 60 may be suppressed.

Furthermore, in the present embodiment, the panel connection portion 51, the body connection portion 52, and the deformation portion 54 are entirely disposed inside the touch panel 22 when viewed from the front surface side of the touch panel 22. With the above, compared with a structure in which the panel connection portion 51, the body connection portion 52, and the deformation portion 54 are arranged so as to jut out from the touch panel 22 when viewed from the front surface side of the touch panel 22, the electronic device 10 may be reduced in size in the surface direction of the touch panel 22.

Furthermore, in the present embodiment, the panel connection portion 51 is disposed on the outer peripheral side (on the −X direction side in FIG. 5) of the touch panel 22 with respect to the deformation portion 54. As described above, since the panel connection portion 51 is disposed so as to be shifted in the −X direction with respect to the deformation portion 54, compared with an arrangement in which the panel connection portion 51 and the deformation portion 54 overlap each other, the dimension of the flexible member 50 in the Y direction may be small.

Furthermore, since the panel connection portion 51 is disposed on the outer peripheral side of the touch panel 22 with respect to the deformation portion 54, the panel connection portion 51 may be connected to the touch panel 22 through the frame-shaped member 42 at a portion nearer to the peripheral edge of the touch panel 22. Accordingly, the sealed space that is sealed by the sealing unit 40 including the panel connection portion 51 and the frame-shaped member 42 may be made large.

Furthermore, in the present embodiment, the body connection portion 52 is disposed on the inner peripheral side (on the X direction side in FIG. 5) of the touch panel 22 with respect to the deformation portion 54. As described above, since the body connection portion 52 is disposed so as to be shifted in the X direction with respect to the deformation portion 54, compared with an arrangement in which the body connection portion 52 and the deformation portion 54 overlap each other, the dimension of the flexible member 50 in the Y direction may be small.

Furthermore, different from the deformation portion 54, the body connection portion 52 is a portion in which no flexible deformation occurs; accordingly, compared to the deformation portion 54, no space is called for therearound. Accordingly, compared with a case in which the deformation portion 54 is disposed on the inner peripheral side of the touch panel 22 with respect to the body connection portion 52, the space on the inner peripheral side of the touch panel 22 is not occupied.

Furthermore, in the present embodiment, since the frame-shaped member 42 has a rigidity that is higher than that of the flexible member 50, compared with a case in which the flexible member 50 is directly fixed to the touch panel 22, the frame-shaped member 42 is fixed easily.

Furthermore, in the present embodiment, since the plate frame 44 has a rigidity that is higher than that of the flexible member 50, compared with a case in which the flexible member 50 is directly fixed to the second housing 62, the plate frame 44 is fixed easily.

Furthermore, in the present embodiment, the head portions 88B of the screws 88 abut against the edge portions of the insertion holes 62D of the second housing 62 so as to restrict the touch panel unit 20 from moving more than a permissible amount in the direction (the Y direction) departing from the second housing 62. Accordingly, the touch panel unit 20 is restricted from jutting out from the first housing 61.

Furthermore, when the frame-shaped member 42 is displaced in the Y direction, the abutting surface 47A abuts against the abutted surface 63A so as to restrict the frame-shaped member 42 (the touch panel 22) from moving in a direction (the Y direction) departing from the second housing 62. The above also restricts the touch panel unit 20 from jutting out from the first housing 61.

(First Modification According to Sealing Unit 140)

In place of the sealing unit 40 described above, a sealing unit 140 described below may be employed.

Figure 7:
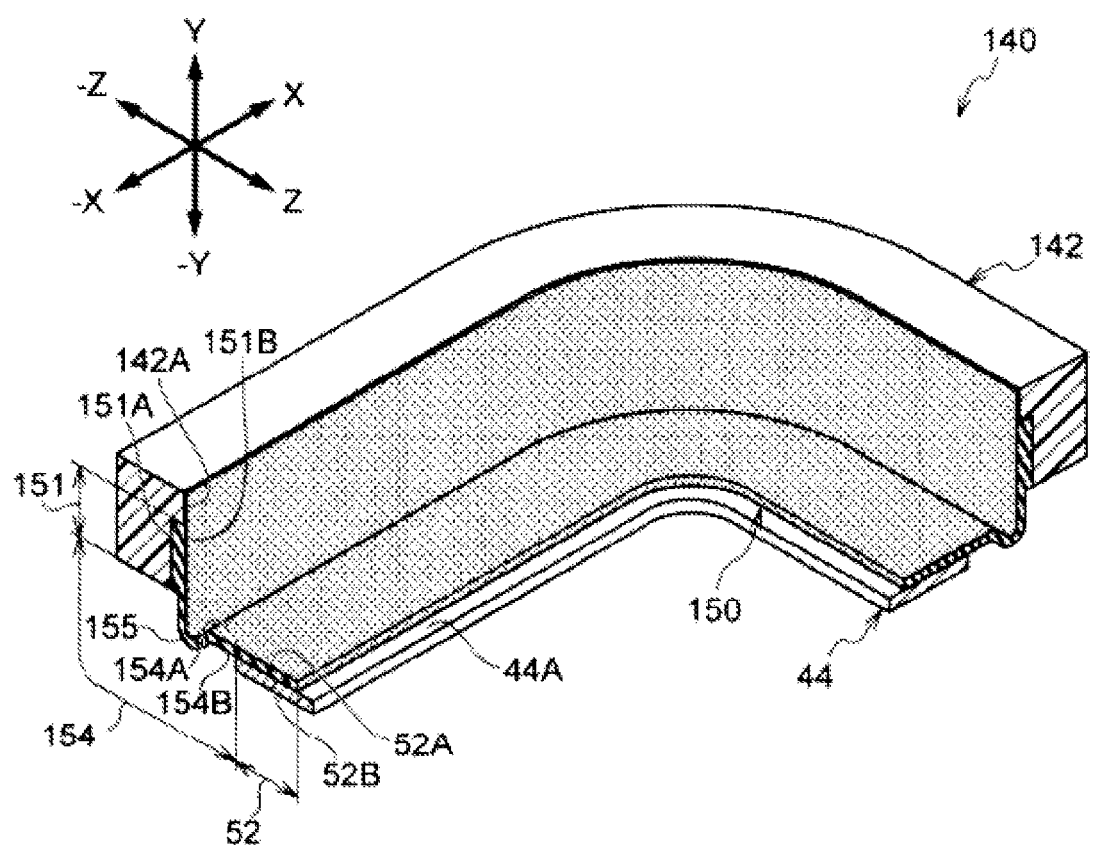
FIG. 7 is a perspective view illustrating, in an enlarged manner, a portion of a sealing unit according to a first modification.

As illustrated in FIG. 7, the sealing unit 140 includes a frame-shaped member 142, a flexible member 150, and the plate frame 44.

In the frame-shaped member 142, a lateral surface 142A on the inner peripheral side protrudes towards the inner peripheral side at a portion on the Y direction side. Accordingly, the frame-shaped member 142 has a step in the lateral surface 142A on the inner peripheral side. While the frame-shaped member 142 is different from the frame-shaped member 42 of the sealing unit 40 in that there is a step in the lateral surface 142A on the inner peripheral side, other portions are the same and have the same structure.

The plate frame 44 of the sealing unit 140 has the same structure as that of the plate frame 44 of the sealing unit 40.

Similar to the flexible member 50 of the sealing unit 40, the flexible member 150 is formed in a frame shape (see FIG. 2) when viewed in the −Y direction. Furthermore, as illustrated in FIG. 7, the flexible member 150 is formed in a tabular shape (a sheet shape). Similar to the flexible member 50 of the sealing unit 40, the flexible member 150 is formed of a material that has elasticity and a waterproof property. Specifically, the flexible member 150 is formed of an elastic material such as, for example, silicone rubber.

Furthermore, the flexible member 150 is disposed along the outer peripheral portion of the touch panel 22 when viewed from the front surface side of the touch panel 22 and seals between the touch panel 22 and the device body 60 (the second housing 62). Moreover, specifically, the flexible member 150 includes a panel connection portion 151, the body connection portion 52, and a deformation portion 154.

The structure of the body connection portion 52 of the flexible member 150 is the same as the structure of the body connection portion 52 of the flexible member 50 of the sealing unit 40.

A lateral surface 151A on the outer peripheral side of the panel connection portion 151 is fixed to the lateral surface 142A of the frame-shaped member 142. Accordingly, the panel connection portion 151 connects the deformation portion 154 and the touch panel 22 (the touch panel unit 20) to each other through the frame-shaped member 142. Note that the lateral surface 151A protrudes towards the outer peripheral side at a portion on the −Y direction side so as to fill the step in the lateral surface 142A of the frame-shaped member 142.

Furthermore, the lateral surface 151A of the panel connection portion 151 is fixed to the lateral surface 142A of the frame-shaped member 142 and is bound thereto. A lateral surface 151B of the panel connection portion 151 is unfixed. In other words, the lateral surface 151B of the panel connection portion 151 is unbound.

The deformation portion 154 connects the panel connection portion 151 and the body connection portion 52 to each other at a portion between the panel connection portion 151 and the body connection portion 52. The deformation portion 154 includes a curved portion 155 that is curved. The curved portion 155 is curved in a convex manner so as to swell out in the −Y direction. In other words, the curved portion 155 is formed so as to sag towards the −Y direction side.

Furthermore, a front surface 154A and a back surface 154B of the deformation portion 154 are unfixed. In other words, the front surface 154A and the back surface 154B of the deformation portion 154 are unbound. Accordingly, the vibration in the thickness direction (the −Y, Y direction) of the touch panel 22 displaces the frame-shaped member 142 and the panel connection portion 151 in the −Y, Y direction and, as a result, flexible deformation occurs in the deformation portion 154 in the −Y, Y direction.

Specifically, deformation in which the deformation portion 154 is curved or bent in a convex manner towards the front surface 154A side and deformation in which the deformation portion 154 is curved or bent in a concave manner towards the front surface 154A side repeatedly occur. When the deformation portion 154 is deformed in a convex manner towards the front surface 154A side, tensile stress occurs on the front surface 154A of the deformation portion 154 and the front surface 154A is expanded. In the back surface 154B of the deformation portion 154, when the deformation portion 154 is deformed in a convex manner towards the front surface 154A side, compressive stress occurs and the back surface 154B is constricted. On the other hand, when the deformation portion 154 is deformed in a concave manner towards the front surface 154A side, compressive stress occurs on the front surface 154A of the deformation portion 154 and the front surface 154A is constricted. In the back surface 154B of the deformation portion 154, when the deformation portion 154 is deformed in a concave manner towards the front surface 154A side, tensile stress occurs and the back surface 154B is expanded. In other words, flexible deformation accompanied with the vibration of the touch panel 22 refers to deformation in which, between the two surfaces (the front surface 154A and the back surface 154B) of the deformation portion 154 that are opposite each other, one surface becomes convex and the other surface becomes concaved.

Furthermore, the entire flexible member 150 is disposed inside the touch panel 22 when viewed from the front surface side of the touch panel 22. Accordingly, the panel connection portion 151, the body connection portion 52, and the deformation portion 154 are entirely disposed inside the touch panel 22 when viewed from the front surface side of the touch panel 22. Specifically, the panel connection portion 151, the body connection portion 52, and the deformation portion 154 are entirely disposed on the inner peripheral side with respect to the peripheral edge of the touch panel 22 when viewed from the front surface side of the touch panel 22. Note that an outer peripheral surface of the flexible member 150 and the outer peripheral surface of the touch panel 22 may be positioned on the same plane. In other words, it is only sufficient that the panel connection portion 151, the body connection portion 52, and the deformation portion 154 each do not jut out to the outside of the touch panel 22 when viewed from the front surface side of the touch panel 22.

In the sealing unit 140 according to the first modification, since the deformation portion 154 includes the curved portion 155, when flexible deformation occurs in the deformation portion 154, tensile force of the deformation portion 154 is small up to the area where there is no sagging. Accordingly, tensile strength does not easily act on the deformation portion 154 and the elasticity of the deformation portion 154 is not lost. Accordingly, a state in which the vibration of the touch panel 22 not being transmitted to the second housing 62 (a device body 60) side may be maintained effectively.

(Second Modification According to Sealing Unit 240)

In place of the sealing unit 40 described above, a sealing unit 240 described below may be employed.

Figure 8:
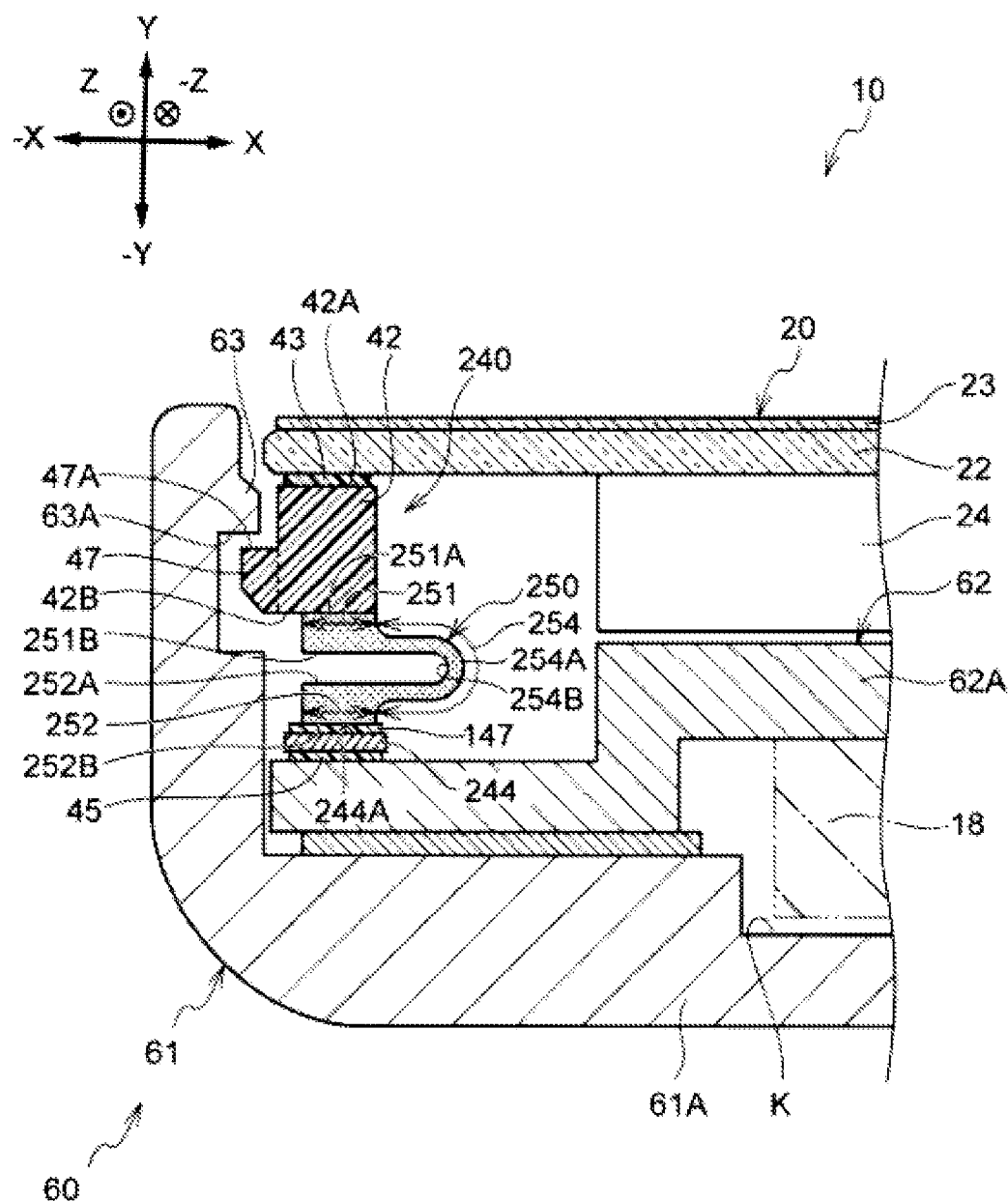
FIG. 8 is a C-C cross-sectional view of an electronic device to which a sealing unit according to a second modification is applied.

As illustrated in FIG. 8, the sealing unit 240 includes the frame-shaped member 42, a flexible member 250, and a plate frame 244.

The frame-shaped member 42 of the sealing unit 240 has the same structure as that of the frame-shaped member 42 of the sealing unit 40.

The plate frame 244 is disposed at a position that overlaps the frame-shaped member 42 when viewed from the front surface side of the touch panel 22. In other words, the plate frame 244 is disposed on the −Y direction side of the frame-shaped member 42 when viewed from the front surface side of the touch panel 22. While the plate frame 244 is different from the frame-shaped member 42 of the sealing unit 40 in that the plate frame 244 is disposed on the −Y direction of the frame-shaped member 42, other portions are the same and have the same structure.

Similar to the flexible member 50 of the sealing unit 40, the flexible member 250 is formed in a frame shape (see FIG. 2) when viewed in the −Y direction. Furthermore, as illustrated in FIG. 8, the flexible member 250 is formed in a tabular shape (a sheet shape). Similar to the flexible member 50 of the sealing unit 40, the flexible member 250 is formed of a material that has elasticity and a waterproof property. Specifically, the flexible member 250 is formed of an elastic material such as, for example, silicone rubber.

Furthermore, the flexible member 250 is disposed along the outer peripheral portion of the touch panel 22 when viewed from the front surface side of the touch panel 22 and seals between the touch panel 22 and the device body 60 (the second housing 62). Moreover, specifically, the flexible member 250 includes a panel connection portion 251, a body connection portion 252, and a deformation portion 254.

The panel connection portion 251 has a thickness that is larger than that of the deformation portion 254. A front surface 251A of the panel connection portion 251 is fixed to the back surface 42B of the frame-shaped member 42. Accordingly, the panel connection portion 251 connects the deformation portion 254 and the touch panel 22 (the touch panel unit 20) to each other through the frame-shaped member 42.

Furthermore, the front surface 251A of the panel connection portion 251 is fixed to the back surface 42B of the frame-shaped member 42 and is bound thereto. A back surface 251B of the panel connection portion 251 is unfixed. In other words, the back surface 251B of the panel connection portion 251 is unbound. A gap is formed between the back surface 251B of the panel connection portion 251 and the body connection portion 252. Accordingly, the panel connection portion 251 and the frame-shaped member 42 are capable of moving in the Y direction side (the side approaching the second housing 62).

The body connection portion 252 is disposed at a position that overlaps the panel connection portion 251 when viewed from the front surface side of the touch panel 22. In other words, the body connection portion 252 is disposed on the −Y direction side of the panel connection portion 251 when viewed from the front surface side of the touch panel 22.

A back surface 252B of the body connection portion 252 is fixed to a front surface 244A of the plate frame 244 with a fixing material 147. Accordingly, the body connection portion 252 connects the deformation portion 254 and the device body 60 (the second housing 62) to each other through the plate frame 244. Note that as the fixing material 147, for example, an adhesive or a double-sided adhesive tape is used.

Furthermore, the back surface 252B of the body connection portion 252 is fixed to the front surface 244A of the plate frame 244 and is bound thereto. A front surface 252A of the body connection portion 252 is unfixed. In other words, the front surface 252A of the body connection portion 252 is unbound.

The whole deformation portion 254 is disposed inside the touch panel 22 when viewed from the front surface side of the touch panel 22. Furthermore, the deformation portion 254 connects the panel connection portion 251 and the body connection portion 252 to each other at a portion between the panel connection portion 251 and the body connection portion 252. One surface 254A and the other surface 254B of the deformation portion 254 are unfixed. In other words, the one surface 254A and the other surface 254B of the deformation portion 254 are unbound. Accordingly, the vibration in the thickness direction (the −Y, Y direction) of the touch panel 22 displaces the frame-shaped member 42 and the panel connection portion 251 in the −Y, Y direction and, as a result, flexible deformation occurs in the deformation portion 254 in the −Y, Y direction.

Specifically, deformation in which the deformation portion 254 is curved or bent in a convex manner towards the one surface 254A side and deformation in which the deformation portion 254 is curved or bent in a concave manner towards the one surface 254A side repeatedly occur. When the deformation portion 254 is deformed in a convex manner towards the one surface 254A side, tensile stress occurs on the one surface 254A of the deformation portion 254 and the one surface 254A is expanded. In the other surface 254B of the deformation portion 254, when the deformation portion 254 is deformed in a convex manner towards the one surface 254A side, compressive stress occurs and the other surface 254B is constricted. On the other hand, when the deformation portion 254 is deformed in a concave manner towards the one surface 254A side, compressive stress occurs on the one surface 254A of the deformation portion 254 and the one surface 254A is constricted. In the other surface 254B of the deformation portion 254, when the deformation portion 254 is deformed in a concave manner towards the one surface 254A side, tensile stress occurs and the other surface 254B is expanded. In other words, flexible deformation accompanied with the vibration of the touch panel 22 refers to deformation in which, between the two surfaces (the one surface 254A and the other surface 254B) of the deformation portion 254 that are opposite each other, one surface becomes convex and the other surface becomes concaved.

Furthermore, the entire flexible member 250 is disposed inside the touch panel 22 when viewed from the front surface side of the touch panel 22. Accordingly, the panel connection portion 251, the body connection portion 252, and the deformation portion 254 are entirely disposed inside the touch panel 22 when viewed from the front surface side of the touch panel 22. Specifically, the panel connection portion 251, the body connection portion 252, and the deformation portion 254 are entirely disposed on the inner peripheral side with respect to the peripheral edge of the touch panel 22 when viewed from the front surface side of the touch panel 22. Note that an outer peripheral surface of the flexible member 250 and the outer peripheral surface of the touch panel 22 may be positioned on the same plane. In other words, it is only sufficient that the panel connection portion 251, the body connection portion 252, and the deformation portion 254 each do not jut out to the outside of the touch panel 22 when viewed from the front surface side of the touch panel 22.

In the sealing unit 240 according to the second modification, the body connection portion 252 is disposed at a position that overlaps the panel connection portion 251 when viewed from the front surface side of the touch panel 22. Accordingly, the sealing unit 240 may be reduced in size in the surface direction (the X direction in FIG. 8) of the touch panel 22.

Figure 9:
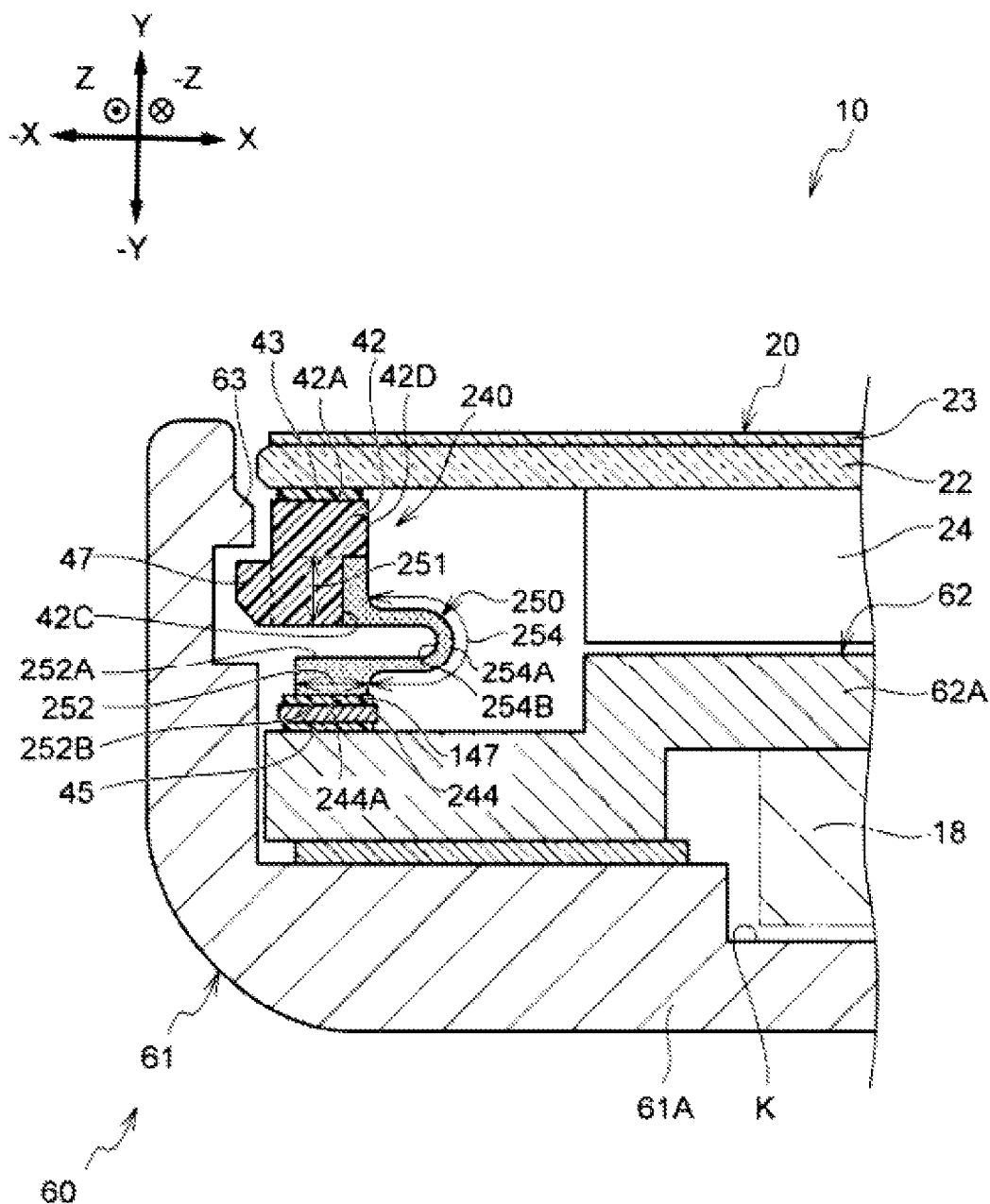
FIG. 9 is a C-C cross-sectional view illustrating a modification of the sealing unit illustrated in FIG. 8.

Note that as illustrated in FIG. 9, the panel connection portion 251 may be provided with a cutaway 42C formed in the frame-shaped member 42. In the structure illustrated in FIG. 9, the cutaway 42C, which is a concavity in a portion on the −Y direction side, is formed in a lateral surface 42D of the inner peripheral side of the frame-shaped member 42. The panel connection portion 251 is provided in the cutaway 42C so as to fill the cutaway 42C. The thickness direction of the panel connection portion 251 is the direction (the X direction in FIG. 9) extending from the inner peripheral side towards the outer peripheral side of the body connection portion 252.

According to the structure illustrated in FIG. 9, since the panel connection portion 251 is provided in the cutaway 42C of the frame-shaped member 42, the sealing unit 240 is reduced in size accordingly in the thickness direction (the Y direction) of the touch panel 22.

Figure 10:
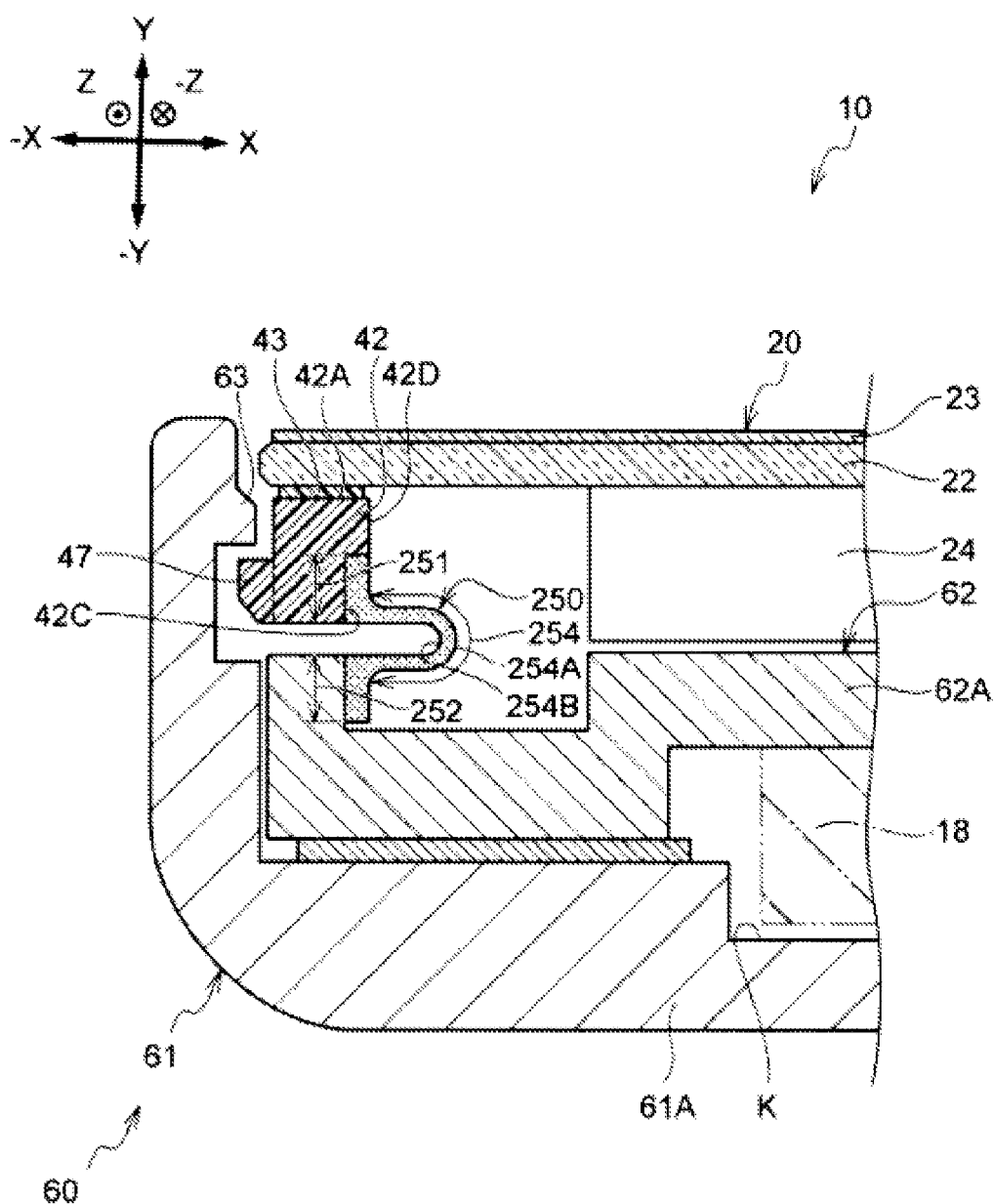
FIG. 10 is a C-C cross-sectional view illustrating a modification of the sealing unit illustrated in FIG. 9.

Furthermore, as illustrated in FIG. 10, the body connection portion 252 may be a structure that is fixed to the second housing 62 without having the plate frame 244 in between. In the structure illustrated in FIG. 10, the body connection portion 252 is fixed to the second housing 62 by being integrally formed with the second housing 62. Note that the thickness direction of the body connection portion 252 is the direction (the X direction in FIG. 9) extending from the inner peripheral side towards the outer peripheral side of the body connection portion 252.

According to the structure illustrated in FIG. 10, since the plate frame 44 may be dispensed of, the number of parts of the sealing unit 240 is reduced.

(Other Modifications)

Figure 11:
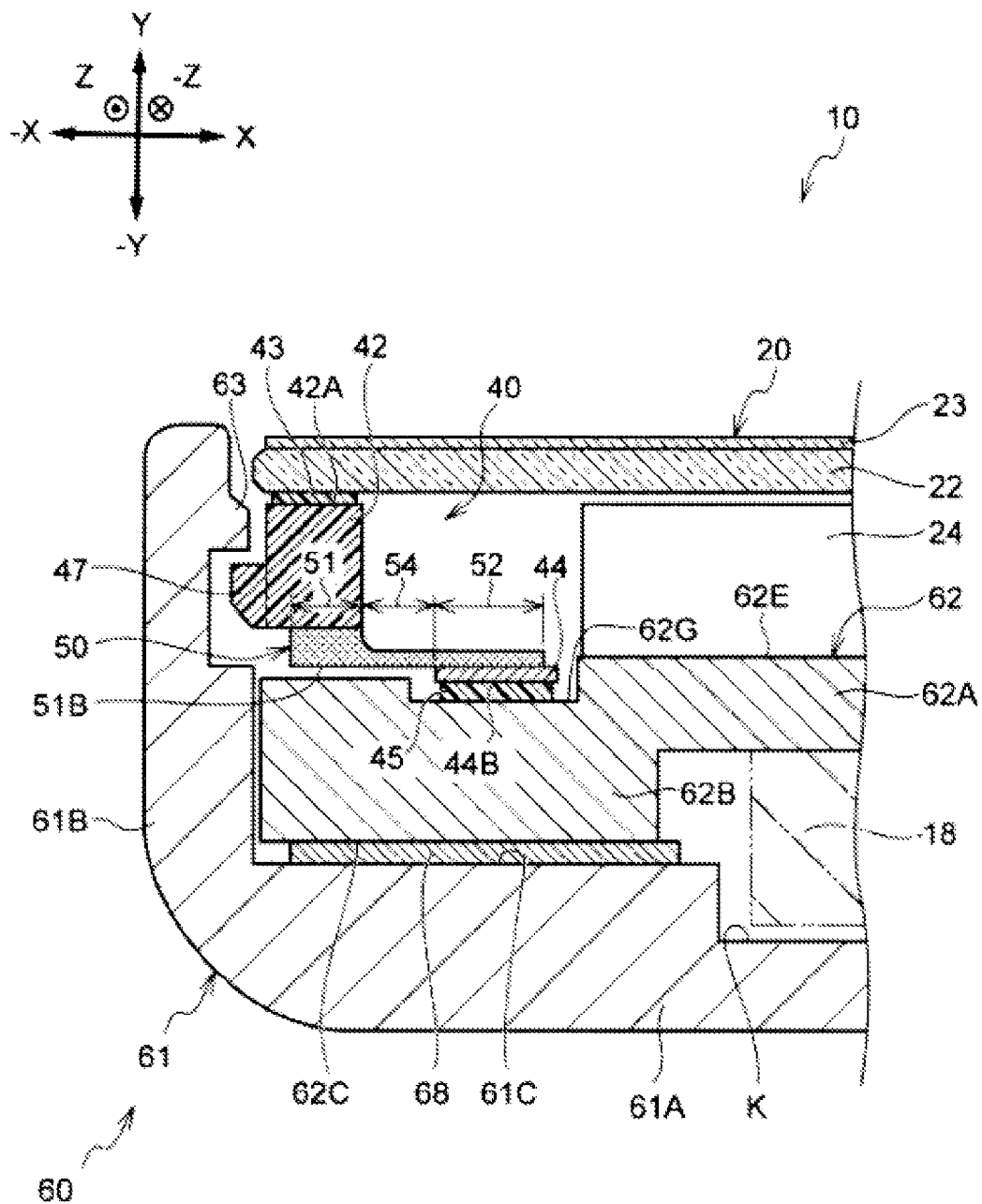
FIG. 11 is a C-C cross-sectional view illustrating a modification in which a display panel is provided on a device body side in the electronic device illustrated in FIG. 5.

In the above embodiment, the touch panel unit 20 included the display unit 24; however, as illustrated in FIG. 11, the structure may be such that the device body 60 includes the display unit 24. In the structure illustrated in FIG. 11, the display unit 24 is fixed to the front surface 62E (the surface on the Y direction side) of the front wall 62A of the second housing 62. Accordingly, the display unit 24 is separated from the touch panel 22.

In the embodiment described above, the panel connection portions 51, 151, and 251 are entirely disposed inside the touch panel 22 when viewed from the front surface side of the touch panel 22; however, the arrangement is not limited to the above. In other words, it is only sufficient that at least a portion of the panel connection portion 51 is disposed inside the touch panel 22 when viewed from the front surface side of the touch panel 22.

In the embodiment described above, the body connection portions 52 and 252 are entirely disposed inside the touch panel 22 when viewed from the front surface side of the touch panel 22; however, the arrangement is not limited to the above. In other words, it is only sufficient that at least a portion of the body connection portion 52 is disposed inside the touch panel 22 when viewed from the front surface side of the touch panel 22.

In the embodiment described above, the deformation portions 54, 154, and 254 are entirely disposed inside the touch panel 22 when viewed from the front surface side of the touch panel 22; however, the arrangement is not limited to the above. In other words, it is only sufficient that at least a portion of the deformation portion 54 is disposed inside the touch panel 22 when viewed from the front surface side of the touch panel 22.

In the embodiment described above, the panel connection portions 51, 151, and 251 and the body connection portions 52 and 252 are disposed inside the touch panel 22 when viewed from the front surface side of the touch panel 22; however, the arrangement is not limited to the above. In other words, the panel connection portions 51, 151, and 251 and the body connection portions 52 and 252 do not have to be disposed inside the touch panel 22 when viewed from the front surface side of the touch panel 22. Accordingly, it is only sufficient that, among the flexible members 50, 150, and 250, the deformation portions 54, 154, and 254 are disposed inside the touch panel 22 when viewed from the front surface side of the touch panel 22.

In the embodiment described above, the panel connection portions 51, 151, and 251 connect the deformation portions 54, 154, and 254 to the touch panel 22 (the touch panel unit 20) through the frame-shaped members 42 and 142; however, the arrangement is not limited to the above. The structure may be such that the panel connection portions 51, 151, and 251 are connected to the touch panel 22, and the deformation portions 54, 154, and 254 are directly connected to the touch panel 22 (the touch panel unit 20).

In the embodiment described above, the body connection portions 52 and 252 connect the deformation portions 54, 154, and 254 to the device body 60 (the second housing 62) through the plate frames 44 and 244; however, the arrangement is not limited to the above. The structure may be such that the body connection portions 52 and 252 are fixed to the device body 60, and the deformation portions 54, 154, and 254 are directly connected to the device body 60.

Furthermore, the plurality of modifications described above may be implemented in combination as appropriate.

Now, a description has been given of the embodiment of the technique disclosed in the present application; however, the technique disclosed in the present application is not limited to the above and it goes without saying that various modifications may be made without departing from the spirit and scope of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device, comprising:
   a device body;
   a touch panel having a front side and a reverse side, the reverse side facing the device body;
   a vibrator disposed on the reverse side and configured to vibrate the touch panel; and
   a flexible member that is entirely disposed between the reverse side of the touch panel and the device body, the flexible member connecting the device body and the reverse side of the touch panel in a watertight manner and being flexibly deformed upon vibration of the touch panel;
   wherein the entirety of the flexible member is located directly beneath the reverse side of the touch panel.

2. The electronic device according to claim 1, wherein the flexible member includes a deformation portion of the flexible member that is flexibly deformed upon vibration of the touch panel, and a body connection portion of the flexible member that connects the deformation portion and the device body to each other, the body connection portion being disposed on the reverse side of the touch panel.

3. The electronic device according to claim 2, wherein the body connection portion and the deformation portion are entirely disposed on an inner peripheral side with respect to a peripheral edge of the touch panel when viewed from the front side of the touch panel.

4. The electronic device according to claim 1, wherein the flexible member includes a deformation portion of the flexible member that is flexibly deformed upon vibration of the touch panel, and a panel connection portion of the flexible member that connects the deformation portion and the touch panel to each other, the panel connection portion being disposed outside the deformation portion when viewed from a front surface side of the touch panel.

5. The electronic device according to claim 4, wherein the panel connection portion has a thickness that is larger than that of the deformation portion and that of the body connection portion.

* * * * *